United States Patent Office 3,422,127
Patented Jan. 14, 1969

3,422,127
ORGANOTIN ALICYCLIC ESTERS
Richard H. Fish, Anaheim, Calif., assignor to United States Borax & Chemical Corporation, Los Angeles, Calif., a corporation of Nevada
No Drawing. Continuation-in-part of application Ser. No. 507,663, Nov. 15, 1965. This application Aug. 11, 1966, Ser. No. 571,688
U.S. Cl. 260—429.7    15 Claims
Int. Cl. A01n 9/24

ABSTRACT OF THE DISCLOSURE

Organotin alicyclic esters of the formula

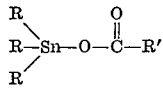

are provided where R is alkyl, aralkyl or aryl and R' is an alicyclic group. The compounds can be prepared by reaction of an alicyclic carboxylic acid with the corresponding organotin hydride, organotin oxide or organotin hydroxide. They are useful as herbicides, insecticides, fungicides and as polymer additives.

---

This application is a continuation-in-part of my copending application Ser. No. 507,663 filed Nov. 15, 1965 and now abandoned.

This invention relates to novel organotin compounds and more particularly, to novel alicyclic tin compounds.

According to the present invention, there are provided organotin compounds of the formula

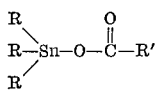

where R is selected from the group consisting of alkyl, aralkyl, and aryl and R' is an alicyclic group. Thus, each group represented by R can be the same or different radicals, such as alkyl and especially the lower alkyl groups of from 1 to about 8 carbon atoms, aralkyl and aryl, especially the monocyclic aralkyl and monocyclic aryl groups such as benzyl, phenylethyl, phenyl and the nuclear substituted derivatives thereof, such as lower alkyl substituted phenyl, lower alkyl substituted benzyl, halophenyl, halobenzyl, nitrophenyl, nitrobenzyl, and the like. The alicyclic group represented by R' is a non-aromatic cyclic hydrocarbon group such as the monocycloalkyl groups of from 3 to about 8 carbon atoms in the ring and the polycyclic bridged hydrocarbon rings, preferably having up to about 12 carbon atoms in the rings, such as bicycloalkyl, bicycloalkenyl, tricycloalkyl, tricycloalkenyl and higher cyclic groups such as pentacycloalkyl. The cyclic groups can also have substituents on the rings such as lower alkyl phenyl, and the halogens.

The organotin compounds of the present invention are generally crystalline solids or high boiling liquids which are soluble in the usual organic solvents such as acetone, alcohols and benzene. The compounds are excellent herbicides when applied as either a pre-emergence or post-emergence treatment and can be formulated with the usual herbicide carriers for use in controlling unwanted plants. They can also be used as insecticides, fungicides and as additives for polymers such as polyvinyl chloride. Reference is made to a copending application of Cecil W. Le Fevre and Richard H. Fish, Ser. No. 571,711, filed Aug. 11, 1966, which discloses and claims the use of the compounds of this invention as herbicides and is assigned to the assignee of the present application.

The novel tin compounds of this invention are readily prepared by reaction of an alicyclic carboxylic acid with the corresponding organotin hydride, organotin oxide or organotin hydroxide. The reactions can be illustrated by the following equations in which R and R' have the significance previously assigned.

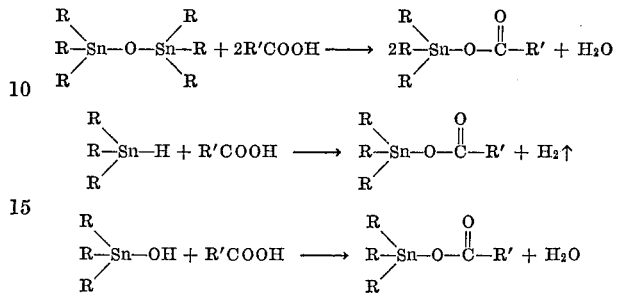

Thus, when an organotin hydroxide or organotin hydride is used, the tin compound and alicyclic carboxylic acid are combined in about equimolar amounts. When an organotin oxide is used, the molar ratio of organotin oxide to alicyclic carboxylic acid is preferably about 1:2. The reactions take place preferably at elevated temperatures such as in the range of from about 50° C. to about 100° C. and generally give high yields of the desired product. An inert liquid reaction medium, such as hexane, benzene and dioxane can be used for ease of handling the reactants and control of the reaction temperature. The desired products are isolated and purified by conventional procedures well known to those skilled in the art.

The following examples are presented to illustrate the preparation of representative compounds of this invention, but it is to be understood that the invention is not to be considered limited to the specific examples given.

EXAMPLE I.—TRIBUTYLTIN 1-ADAMANTANE-
CARBOXYLATE (A) Hydride method

To 2.79 grams (0.011 mole) of tributyltin hydride was added 1.8 grams (0.009 mole) of 1-adamantanecarboxylic acid dissolved in a 3:1 solution of hexane-dioxane. The reaction mixture was refluxed for 15 hours. The solvent was removed by distillation under reduced pressure and the remaining residue was then distilled giving 3.67 grams (85%) of the desired product, B.P. 175° C./0.3 mm.; M.P. 31°–34° C.

Analysis.—Calculated for $C_{23}H_{42}O_2Sn$: C, 58.76; H, 9.15. Found: C, 58.56; H, 8.98.

(B) Oxide method

To 19.0 grams (0.0319 mole) of tributyltin oxide dissolved in 10 ml. of hexane was added 11.5 grams (0.0639 mole) of 1-adamantanecarboxylic acid dissolved in 75 ml. of 4:1 hexanedioxane solution. The reaction mixture was refluxed for 2.5 hours and the solvent was then concentrated using a Rinco evaporator. The remaining residue was cooled in an ice bath to crystallize 28.9 grams (96%) of the product, M.P. 32°–35° C.

EXAMPLE II.—TRIPROPYLTIN 1-ADAMAN-
TANECARBOXYLATE

To 2.0 grams (0.008 mole) of tripropyltin hydride was added 1.45 grams (0.008 mole) of 1-adamantanecarboxylic acid dissolved in 13 ml. of a 3:1 hexane-dioxane solution. The reaction mixture was refluxed for 22 hours and the solvent then removed by distillation under reduced pressure. The remaining residue was distilled giving 1.58 grams (46%) of the desired product, B.P. 148°–150° C./0.1 mm.; M.P. 36°–38° C.

*Analysis.*—Calculated for $C_{20}H_{36}O_2Sn$: C, 56.27; H, 8.49. Found: C, 56.03; H, 8.34.

EXAMPLE III.—TRIPHENYLTIN 1-ADAMANTANECARBOXYLATE

To 3.32 grams (0.009 mole) of triphenyltin hydride was added 1.70 grams (0.009 mole) of 1-adamantanecarboxylic acid dissolved in 2 ml. of dioxane. The reaction mixture was refluxed for 3 hours. The solution contained an insoluble precipitate which was removed by filtration. The filtrate was cooled in an ice bath to precipitate 2.6 grams (52%) of the desired product, M.P. 156°–159° C.

*Analysis.*—Calculated for $C_{29}H_{31}O_2Sn$: C, 65.69; H, 5.89. Found: C, 66.09; H, 6.03.

EXAMPLE IV.—TRIBENZYLTIN 1-ADAMANTANECARBOXYLATE

To a reaction flask equipped with a magnetic stirring bar and a reflux condenser was added 3.71 grams (0.0094 mole) of tribenzyltin hydride and 1.70 grams (0.0094 mole) of 1-adamantanecarboxylic acid dissolved in 25 ml. of a hexane-ether (4:1) solution. The reaction mixture was heated in an oil bath at 50° C. for 20 hours. The solution was filtered hot through a filter aid and the clear filtrate concentrated to precipitate 2.5 grams (46%) of the product, M.P. 90.5°–94° C.

*Analysis.*—Calculated for $C_{43}H_{36}O_2Sn$: C, 67.25; H, 6.35. Found: C, 67.17; H, 6.30.

EXAMPLE V.—TRIETHYLTIN 1-ADAMANTANECARBOXYLATE

To a reaction flask equipped with a magnetic stirring bar, reflux condenser and a serum cap was added 2.3 grams (0.013 mole) of 1-adamantanecarboxylic acid dissolved in a hexane-ether (4:1) solution. To this stirring solution was added via a syringe 2.7 grams (0.013 mole) of triethyltin hydride at room temperature. The reaction mixture was refluxed for 5 hours and then allowed to cool to room temperature affording 3.9 grams (78%) of the product, M.P. 116.5°–117° C.

*Analysis.*—Calculated for $C_{17}H_{30}O_2Sn$: C, 53.02; H, 7.85. Found: C, 53.02; H, 7.96.

EXAMPLE VI.—TRI-N-BUTYLTIN CYCLOHEXANECARBOXYLATE

In a flask equipped with a magnetic stirring bar and reflux condenser was placed 10 grams (0.0168 mole) of tri-n-butyltin oxide and 4.3 grams (0.033 mole) of cyclohexanecarboxylic acid dissolved in 25 ml. of hexane. The reaction mixture was refluxed for 25 hours and then cooled to give 5.95 grams (87%) of crystalline product, M.P. 66°–68° C., which was isolated by filtration.

EXAMPLE VII.—TRIPROPYLTIN CYCLOPROPANECARBOXYLATE

In a flask equipped with a magnetic stirring bar, reflux condenser and septum was placed 1.04 grams (0.0121 mole) of cyclopropanecarboxylic acid in 5 ml. of hexane. To this was added 3.0 grams (0.0121 mole) of tripropyltin hydride in 4 ml. of hexane. The reaction mixture was heated for 1 hour at reflux and then cooled to give 4.0 grams (100%) of crystalline product which was isolated by filtration; M.P. 115.5°–116° C.

EXAMPLE VIII.—TRIBENZYLTIN 2-BICYCLO(2.2.1)HEPT-5-ENECARBOXYLATE

In a flask equipped with magnetic stirring bar and reflux condenser was added 1.6 grams (0.0039 mole) of tribenzyltin hydroxide and 0.44 gram (0.0039 mole) of bicyclo(2.2.1)hept-5-ene-2-carboxylic acid in 30 ml. of benzene. The reaction mixture was refluxed for 15 hours and the benzene then removed by distillation to give a white, sticky solid which was titurated with pentane and filtered. The solid was recrystallized from pentane-ether and washed with ethanol to give 0.5 gram (25%) of product; M.P. 98°–100° C.

EXAMPLE IX.—TRIPHENYLTIN 2-BICYCLO(2.2.1)HEPT-5-ENECARBOXYLATE

In a flask equipped with magnetic stirring bar and reflux condenser was placed 14.55 grams (0.038 mole) of triphenyltin hydroxide and 5.5 grams (0.038 mole) of bicyclo(2.2.1)hept-5-ene-2-carboxylic acid dissolved in 60 ml. of benzene. The reaction mixture was refluxed for 3.5 hours and then the benzene was removed with a rotary evaporator. The residue was stirred in pentane and filtered to give 15.0 grams (81%) of product, M.P. 85°–93° C. After repeated recrystallizations from ethanol, the product melts at 101°–103° C.

EXAMPLE X.—TRIPROPYLTIN 2-BICYCLO(2.2.1)HEPT-5-ENECARBOXYLATE

In a flask equipped with a magnetic stirring bar, reflux condenser and a septum was placed 2.49 grams (0.018 mole) of bicyclo(2.2.1)hept-5-ene-2-carboxylic acid dissolved in 35 ml. of dry hexane. To this was added 4.5 grams (0.018 mole) of tripropyltin hydride. The reaction mixture was refluxed for 11 hours and then cooled to give 4.4 grams (65%) of product, M.P. 51°–55° C. An analytical sample was obtained by recrystallization from hexane, M.P. 56°–57° C.

EXAMPLE XI.—TRIETHYLTIN 2-BICYCLO(2.2.1)HEPT-5-ENECARBOXYLATE

In a flask equipped with a magnetic stirring bar, condenser and a septum was placed 2.49 grams (0.018 mole) of bicyclo(2.2.1)hept-5-ene-2-carboxylic acid dissolved in 35 ml. of dry hexane. To this stirring solution was added 3.74 grams (0.018 mole) of triethyltin hydride. The reaction mixture was refluxed for 4 hours and, after cooling, 3.9 grams (63%) of crystalline product was collected by filtration, M.P. 89°–92° C. An analytical sample, M.P. 94.5–96° C., was obtained by recrystallization from pentane-ether.

EXAMPLE XII.—EXO TRI-n-BUTYLTIN BICYCLO(3.1.0)HEXANE-6-CARBOXYLATE

In a flask equipped with a magnetic stirring bar, reflux condenser and septum was placed 1.5 grams (0.1151 mole) of exo bicyclo(3.1.0)hexane-6-carboxylic acid in 20 ml. of dry hexane. To this stirring solution was added 3.4 grams (0.0576 mole) of tri-n-butyltin oxide. The moderately exothermic reaction mixture was refluxed for 3.0 hours. The solution was then cooled to give white crystals which were filtered and dried to obtain 3.8 grams (80%) of product, M.P. 104°–104.5° C.

The following are among the many other compounds according to the present invention which can be prepared by the foregoing procedures:

tri-n-butyltin nonachloropentacyclo(5.2.0.0$^{2,5}$0$^{3,9}$0$^{4,8}$) nonane-3-carboxylate, $n_D^{25}$ 1.5340
tri-n-propyltin cyclobutanecarboxylate, M.P. 87°–90° C.
tri-n-propyltin cyclopentanecarboxylate, M.P. 87.5°–88° C.
tri-n-propyltin cyclohexanecarboxylate, M.P. 78°–80° C.
tri-n-butyltin trans 2-phenylcyclopropanecarboxylate, M.P. 94.5°–95.5° C.
tri-n-butyltin cis 2-phenylcyclopropanecarboxylate, M.P. 107.5°–108° C.
tri-n-butyltin cyclooctanecarboxylate, M.P. 71°–72° C.
tri-n-butyltin cyclopropanecarboxylate, M.P. 91.5°–92.5° C.
tri-n-butyltin cyclobutanecarboxylate, M.P. 88°–89° C.
tri-n-butyltin cyclopentanecarboxylate, M.P. 83°–84° C.
exo-tri-n-butyltin 3-tricyclo(3.2.1.0$^{2,4}$)oct-6-enecarboxylate, M.P. 99°–100° C.
exo-tri-n-butyltin bicyclo(4.1.0)heptane-7-carboxylate, M.P. 108°–108.5° C.

exo-tri-n-butyltin bicyclo (5.1.0)octane-8-carboxylate, M.P. 113°–115° C.
exo-tri-n-butyltin bicyclo(6.1.0)nonane-9-carboxylate, M.P. 125.5°–126° C.
trin-n-butyltin bicyclo(2.2.1)heptane-2-carboxylate, M.P. 72°–72.5° C.
tri-n-butyltin 3-nortricyclenecarboxylate, M.P. 72°–73° C.

The presently preferred compounds are those in which R is lower alkyl and R' is adamantane or norbornenyl (2-bicyclo-[2.2.1]hept-5-ene) in the above formulae.

The organotin compounds of this invention are effective herbicidal compounds useful for controlling weed growth. "Weeds" as used herein is intended to include any plant growth which is undesirable. The compounds are useful as a pre-emergence or post-emergence treatment; that is, they can be used to kill or suppress the growth of plants or to kill or prevent the emergence of seedlings of unwanted plants. Thus, the compounds can be used to control the growth of weeds by applying a phytotoxic amount to the locus of the weeds, that is, the foliage of the growing plants or soil in which the weeds are growing or will grow.

Generally an application rate of from about 0.5 to about 25 pounds of one or more of the active compounds per acre is an effective phytotoxic amount, although greater or lesser amounts can be used if desired. The presently preferred application rate is in the range of from about 3 to about 15 pounds per acre. At lower application rates some of the compounds have selective activity and are especially useful for controlling weed growth in crops. For example tributyltin 1-adamantanecarboxylate is especially useful for controlling weeds such as Johnson grass, crabgrass, ryegrass, watergrass, foxtail, pigweed, lamb's quarter, ragweed, and mustard in the desired crops peanuts, soybeans and sorghum.

The following examples illustrate the herbicidal activity of representative compounds of this invention.

EXAMPLE XIII

Tri-n-butyltin cyclopropanecarboxylate in methanol solution was applied as a pre-emergence treatment at an application rate of 2.5 pounds per acre to mustard, bindweed, ragweed, lamb's quarter, pigweed, foxtail, watergrass, ryegrass, crabgrass, and Johnson grass. Thirty-four days after treatment, a complete kill or non-emergence of all plants was obtained.

EXAMPLE XIV

Tri-n-butyltin 1-adamantanecarboxylate in methanol solution was applied as a pre-emergence treatment at an application rate of 2.5 pounds per acre to Johnson grass, crabgrass, ryegrass, watergrass, foxtail, pigweed, lamb's quarter, ragweed, mustard, peanuts, soybeans and sorghum. Thirty-four days after treatment a complete kill or non-emergence of all weeds was obtained without injury to the peanuts, soybeans or sorghum.

EXAMPLE XV

Exo-tri-n-butyltin 3-tricyclo(3.2.1.0$^{2,4}$)oct-6-enecarboxylate in methanol solution was applied at a rate of 8 pounds per acre as a post-emergence treatment to mustard, ryegrass and millet. Thirty-one days after treatment, a complete kill of the plants was obtained.

EXAMPLE XVI

Tripropyltin 2-bicyclo(2.2.1)hept-5-enecarboxylate in methanol solution was applied at a rate of 4 pounds per acre as a pre-emergence treatment to mustard, bindweed, ragweed, velvetleaf, lamb's quarter, pigweed, foxtail, ryegrass, watergrass, wild oats, Johnson grass and crabgrass. Thirty-four days after treatment a complete kill or non-emergence of all plants was obtained.

EXAMPLE XVII

Exo-tri-n-butyltin bicyclo(3.1.0)hexane-6-carboxylate was applied in a methanol solution at a rate of 4 pounds per acre as a pre-emergence treatment to foxtail, watergrass, ryegrass, crabgrass, Johnson grass, rice, barley, oats and corn. Thirty-six days after treatment a complete kill of all weeds was obtained with no injury to rice, barley, oats or corn.

EXAMPLE XVIII

Tri-n-butyltin trans-2-phenylcyclopropanecarboxylate in methanol solution was applied at a rate of 5 pounds per acre as a pre-emergence treatment to millet, ryegrass, peas, mustard and cucumbers. Thirty-one days after treatment a complete kill or non-emergence of all plants was obtained.

EXAMPLE XIX

Tri-n-butyltin 3-nortricyclenecarboxylate in methanol solution was applied at an application rate of 4 pounds per acre as a pre-emergence treatment to bindweed, ragweed, velvetleaf, lamb's quarter, and pigweed. Thirty-four days after treatment a complete kill or non-emergence of all plants was obtained.

EXAMPLE XX

Tri-n-butyltin nonachloropentacyclo(5.2.0.0$^{2,5}$0$^{3,9}$0$^{4,8}$) nonane-3-carboxylate in methanol solution was applied at a rate of 4 pounds per acre as a pre-emergence treatment to mustard, bindweed, lamb's quarter, pigweed and foxtail. Thirty-four days after treatment a complete kill or non-emergence of all plants was obtained.

Since a relatively small amount of one or more of the active organotin compounds should be uniformly distributed over the area to be treated, the compounds are formulated preferably with conventional herbicide carriers, either liquid or solid. Thus, the compounds can be impregnated on or admixed with a solid pulverulent carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quarternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid carrier.

Concentrated compositions containing the active herbicidal agent which can be subsequently diluted, as with water, to the desired concentration for application to plants and soil, are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99% by weight of one or more of the active organotin compounds with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as sodium chlorate and the sodium borates, 2,3,6-trichlorobenzyloxypropanol, the chlorophenoxyacetic acids, trichlorobenzoic acids, substituted ureas, triazines, uracils and carbamates, can be included in the formulations.

Various changes and modifications of the invention can be made and, to the extent that such variations incorporate the spirit of this invention, they are intended to be included within the scope of the appended claims.

What is claimed is:

1. A compound of the formula

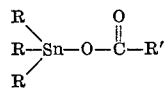

where each R is selected from the group consisting of alkyl, aralkyl and aryl and R' is a polycyclic bridged hydrocarbon ring having up to about 12 carbon atoms in the rings.

2. A compound according to claim 1 in which R is lower alkyl.

3. A compound according to claim 1 in which R is lower alkyl and R' is adamantane.

4. A compound according to claim 1 in which R is lower alkyl and R' is norbornenyl.

5. A compound according to claim 1 in which R' is a bicycloalkyl group having up to about 12 carbons atoms in the rings.

6. A compound according to claim 1 in which R' is a bicycloalkenyl group having up to about 12 carbon atoms in the rings.

7. A compound according to claim 1 in which R' is a tricycloalkyl group having up to about 12 carbon atoms in the rings.

8. Triphenyltin 1-adamantanecarboxylate.
9. Tri-n-butyltin nonachloropentacyclo(5.2.0.0$^{2,5}$0$^{3,9}$0$^{4,8}$)nonane-3-carboxylate.
10. Tri-n-butyltin 2-phenylcyclopropanecarboxylate.
11. Tri-n-butyltin 3-nortricyclenecarboxylate.
12. Tri-n-butyltin 1-adamantanecarboxylate.
13. Tri-n-butyltin 2-bicyclo(2.2.1)hept-5-enecarboxylate.
14. Exo-tri-n-butyltin bicyclo(4.1.0)heptane-7-carboxylate.
15. Tri-n-butyltin cyclopropanecarboxylate.

References Cited

UNITED STATES PATENTS

| | | | |
|---|---|---|---|
| 3,031,483 | 4/1962 | Koopmans et al. | 260—429.7 |
| 3,306,920 | 2/1967 | Tamblyn et al. | 260—429.7 |

FOREIGN PATENTS 1,168,429  4/1964  Germany.

HELEN M. McCARTHY, *Primary Examiner.*

W. F. W. BELLAMY, *Assistant Examiner.*

U.S. Cl. X.R.

71—84, 97; 260—45.75, 999